INVENTOR.
Ralph S. Zebarth
BY
ATTORNEY

Feb. 27, 1962        R. S. ZEBARTH        3,022,646
MACHINE FOR CONTINUOUS COOLING OF GIBLETS
Filed Jan. 19, 1959        4 Sheets-Sheet 4
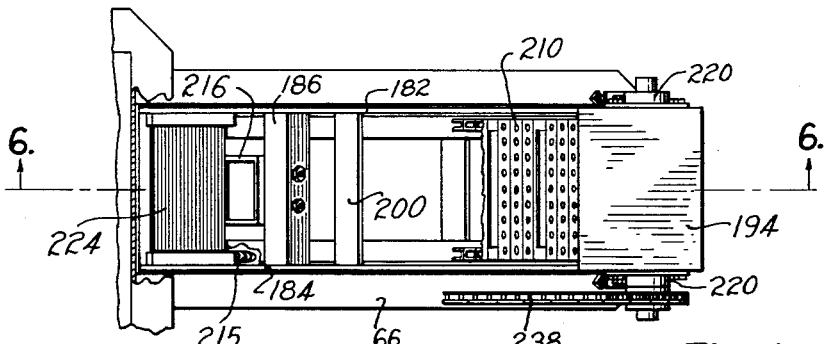
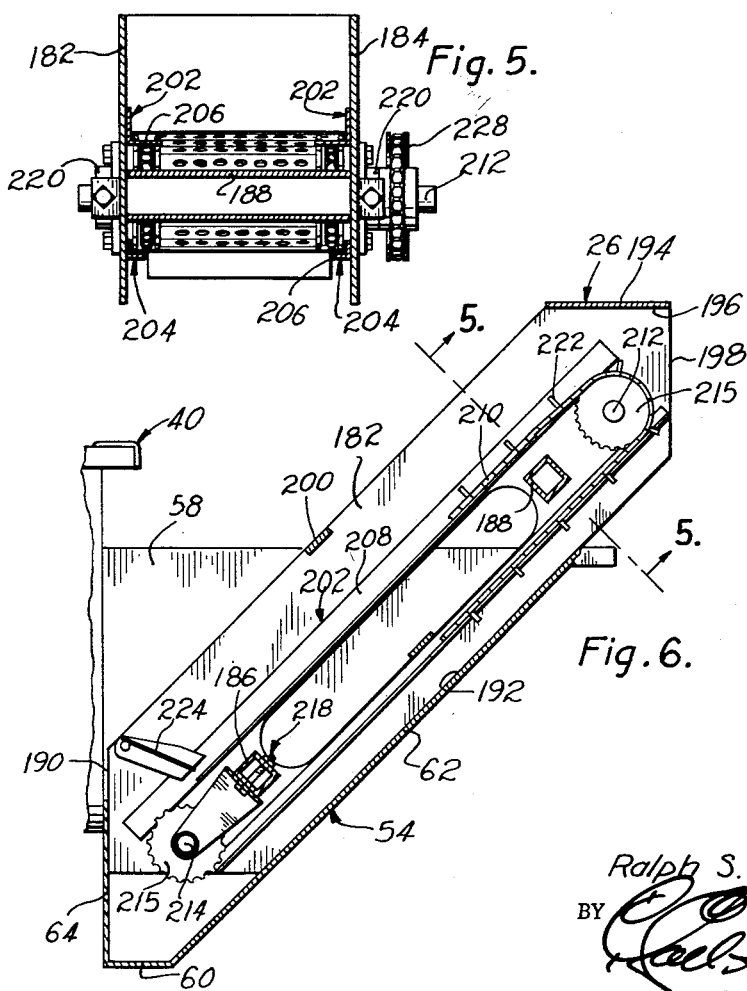
INVENTOR.
Ralph S. Zebarth
BY
ATTORNEY

United States Patent Office 3,022,646
Patented Feb. 27, 1962

3,022,646
MACHINE FOR CONTINUOUS COOLING
OF GIBLETS
Ralph S. Zebarth, Hickman Mills, Mo., assignor, by mesne assignments, to Gordon Johnson Company, Kansas City, Mo., a corporation of Missouri
Filed Jan. 19, 1959, Ser. No. 787,718
7 Claims. (Cl. 62—381)

This invention relates to poultry processing equipment and has for its primary object to provide an efficient and trouble-free machine for lowering the temperature of giblets or the like to a predetermined point in a minimum of time and subsequent to the conventional cleaning and processing operations thereon.

In the killing, dressing and cleaning of poultry preparatory to packaging of the same for marketing, most commercial processors separate the edible viscera from the remaining portion of the birds and subject such viscera to independent cleaning and dressing processes in order to permit substantially uninterrupted dressing and cleaning of such poultry. The gizzards for example, are either manually or automatically cut, the grit removed therefrom and then the hearts, livers and skinned gizzards combined for passage through suitable washing equipment.

It has been determined that better quality products are obtained if the individual parts of the birds are cooled to a predetermined, relatively low level prior to packaging of the same for distribution or subsequent freezing. Although equipment has previously been provided for chilling whole birds, it has not heretofore been possible to satisfactorily precool the giblets, since the latter are normally placed within a suitable parchment wrap or plastic bag and then replaced within the body cavity of the birds immediately prior to packaging of the same. It can therefore be seen that the birds are normally packaged at a somewhat lower temperature than the giblets, which is disadvantageous from the standpoint of producing a final dressed product of maximum quality and tenderness.

It is therefore a further important object of the present invention to provide a machine for continuously cooling giblets to a low level temperature approximating that of the whole birds immediately prior to packaging of the same, and with such giblets cooled in a time interval substantially corresponding to the time required to lower the temperature of the whole birds, whereby continuous, substantially uninterrupted processing of the poultry products may be efficiently carried out.

A still further important object of the invention is to provide a machine for continuously cooling giblets which is of unique construction, permitting the same to be rapidly cleaned at relatively frequent intervals to assure that the cleanlines of the machine remains within governmental standards and without the necessity of interrupting the principal poultry dressing line for extended periods.

An equally important object of the invention is to provide a machine for continuously cooling giblets wherein maximum quantities of giblets may be subjected to a liquid coolant during each twenty-four hour period, notwithstanding the fact that the machine must be stopped at selected periods in order to clean the same, by virtue of the provision of a pair of substantially identical cooling structures disposed in side-by-side relationship and permitting simultaneous cooling of giblets along parallel paths of travel and within an integrated machine.

Another important aim of the invention is to provide a machine for continuous cooling of giblets wherein the temperature of the same may be rapidly lowered to a predetermined low level by virtue of maintenance of the water through which the giblets are advanced at a low temperature, by the simple expedient of adding suitable quantities of ice to the coolant liquid.

Other important objects of the invention relate to the provision of a machine for continuously cooling giblets wherein the latter are continuously tumbled and agitated as the same are advanced through the cold water, whereby the body heat is rapidly removed from such giblets while the tenderness of the same is also improved by virtue of the kneading and flexing of the hearts, livers and gizzards by the water; to a machine of the aforementioned character wherein is provided a perforated, tubular drum rotatably disposed in the liquid coolant and adapted to receive the giblets for tumbling and agitating the same while advancing such giblets through the liquid, with novel means being provided on the rotatable structure and extending thereinto in a position to engage the products to be cooled to prevent the latter from collecting at the lowermost portion of the tubular structure during advancement of the giblets therethrough, notwithstanding the tendency of the giblets to slide on the inner surface of the tubular structure because of the inherent slickness of the outer faces of the edible viscera; to a machine wherein the tubular structure for agitating, tumbling and advancing the giblets may readily be raised out of the coolant liquid when desired, by virtue of the fact that the perforated, tubular drums are suspended from vertically reciprocable mechanism carried by the liquid receptacles in overlying relationship to the tubular, giblet-receiving structure, whereby the receptacles may be rapidly cleaned upon movement of the tubular structure out of the same; to novel power driven components operably coupled with the tubular structures for rotating the same on the longitudinal axes thereof and movable with the platform from which the tubular structures are suspended, whereby the latter may be rotated regardless of the relative positions of the tubular structures within the receptacles therefor and without any adjustments in the drive components being required; to improved conveyor assemblies for lifting the giblets out of the liquid coolant after the same have been advanced therethrough with the conveyor assemblies also being readily removable from the coolant to thereby permit cleaning of the conveyors, as well as the sumps connected to respective receptacles and adapted to receive the defined conveyor assemblies; to unique vane means on the external surfaces of each of the tubular drums in longitudinally extending, circumferentially spaced relationship for agitating the liquid coolant in each receptacle to thereby improve the kneading and flexing of the giblets by such coolant during advancement of the giblets therethrough; to simple and effective guide means for maintaining the tubular drums receiving the giblets in predetermined longitudinal relationship within respective receptacles, notwithstanding the fact that the tubular structures are suspended from drive mechanism for rotating the same and are reciprocable vertically into and out of the receptacles; to a machine wherein the liquid coolant is permitted to overflow as fresh liquid is directed into the receptacles, whereby the entire coolant may be changed within a predetermined interval of time; and to other important objects and details of construction of the present machine which will become obvious or be described in greater detail as the following specification progresses.

In the drawings:

FIG. 4 is an enlarged, fragmentary, plan view of one of the conveyor assemblies normally located at one end of the machine and with portions thereof being broken away;

FIG. 5 is an enlarged, cross-sectional view taken on the line 5—5 of FIG. 6, looking in the direction of the arrows and thereby illustrating a portion of the conveyor assembly shown in FIG. 4; and FIG. 6 is a vertical, enlarged, cross-sectional view taken on the line 6—6 of FIG. 4.

Figure 1:
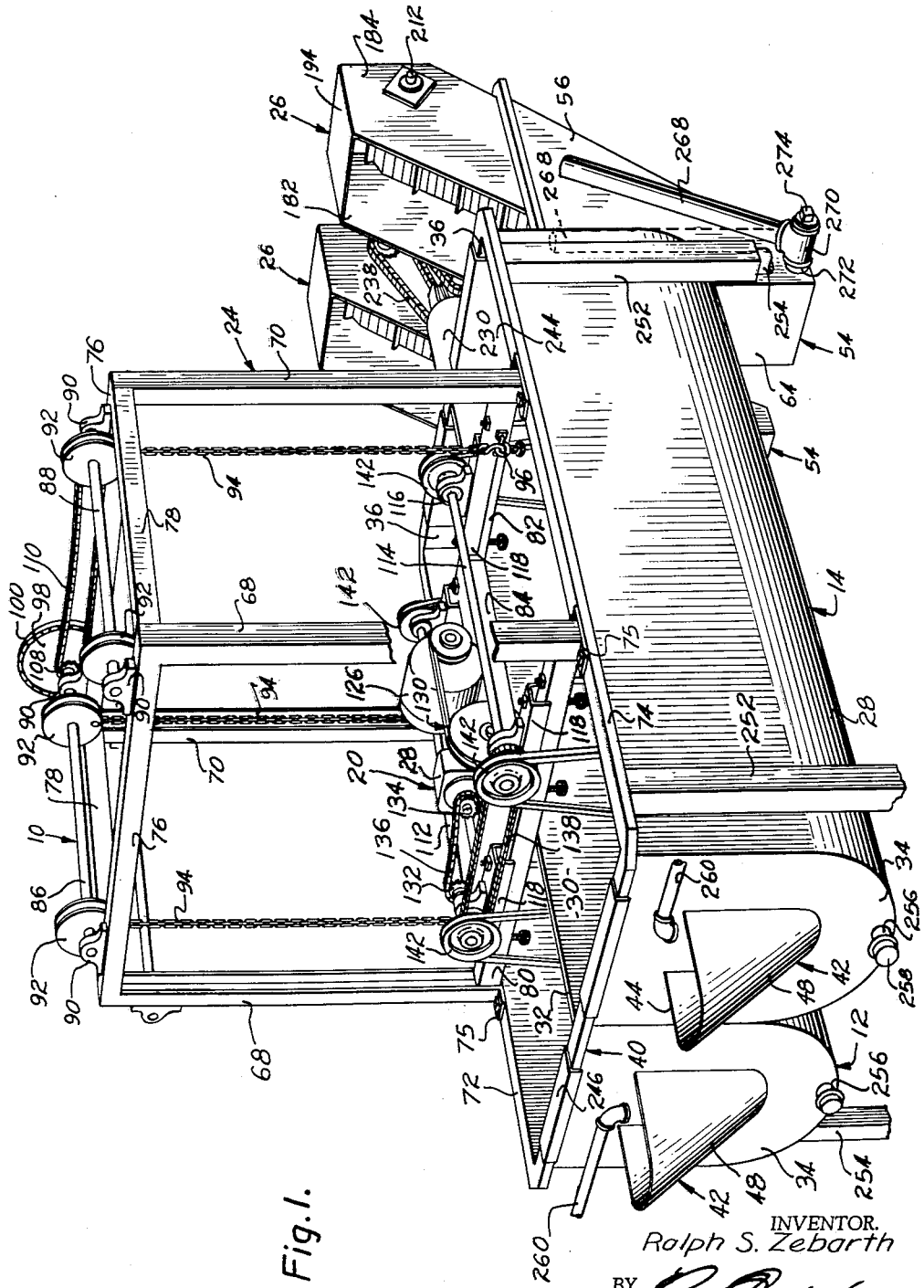
FIGURE 1 is a perspective view of a machine for continuously cooling giblets and embodying the principles of the present invention.

A machine for continuously cooling giblets and broadly designated 10 in the drawings, is illustrated in its preferred form and includes as basic components, a pair of elongated, substantially identical receptacles 12 and 14 disposed in side-by-side relationship, tubular structures 16 and 18 adapted to be removably and rotatably disposed within each of the receptacles 12 and 14 respectively, elevating and driving mechanism 20 carrying structures 16 and 18 and mounted on frame means 24 for vertical reciprocation relative thereto, frame means 24 in turn being secured to receptacles 12 and 14, and conveyor means 26 at corresponding ends of receptacles 12 and 14 for raising giblets out of the liquid coolant after advancement therethrough, as will be explained hereinafter.

Each of the receptacles 12 and 14 comprises a rectangular sheet of metal 28 bent longitudinally thereof into substantially U-shaped, transverse configuration with side walls 30 and 32 disposed in aligned, abutting relationship and suitably interconnected as by welding or the like. Opposed, U-shaped ends of each of the receptacles 12 and 14 are closed by U-shaped inlet end panels and outlet end panels 34 and 36 respectively and having outer margins conforming to the configuration of receptacles 12 and 14 and terminating in parallel alignment with the uppermost margins of the defined elongated, trough-like receptacles 12 and 14. A transversely L-shaped rim member 40 is secured to the upper polygonal margin defined by receptacles 12 and 14, although it can be appreciated that member 40 may be integral with respective sheets 28 and panels 34 and 36.

Transversely U-shaped chutes 42 secured to the outer faces of each of the panels 34 with the upper margins 44 thereof presenting inlet openings, communicate with the interior of respective receptacles 12 and 14 through circular openings 46 provided in each of the panels 34 in alignment with corresponding chutes 42. In this connection it is to be noted that the outer, integral, transversely arcuate portions 48 of each of the chutes 42 are disposed at an angle relative to panels 34 with the lowermost ends of portions 48 in closer proximity to respective panels 34 than the upper edges thereof whereby giblets or the like directed into chutes 42 gravitate into the interior of receptacles 12 and 14 through corresponding openings 46 since the lowermost marginal extremity 50 of each of the chutes 42 is complementally aligned with the lower arcuate segments of openings 46.

Similarly, outlet end panels 36 are provided with circular openings 52 therein, axially aligned with opposed openings 46, and communicating the interior of respective receptacles 12 and 14 with spaced sumps 54 secured to the outermost faces of respective panels 36. Each of the sumps 54 is substantially trapezoidal in vertical, transverse cross-section and thereby includes a pair of upright, horizontally spaced, parallel, aligned trapezoidal side walls 56 and 58 having a horizontal bottom wall 60 connected to and spanning the distance between the lowermost margins of walls 56 and 58 and an end wall 62 interconnecting the parallel, angularly disposed edges of walls 56 and 58 remote from respective end panels 36. Front wall 64 of each of the sumps 54 extends upwardly from corresponding bottom walls 60 and terminates above the lowermost portions of receptacles 12 and 14 a sufficient distance to cause respective end walls 36 to close sumps 54. Transversely L-shaped rim member 66 also extends around the upper, U-shaped margin of each of the sumps 54 and may be either connected to or integral with the edges of side walls 56 and 58 and end wall 62. Conveyor assemblies 26, removably disposed within respective sumps 54, will be described in greater detail hereinafter.

Frame means 24 comprises a pair of channels 68 and 70 secured in horizontally spaced, upright positions to the outer, longitudinally extending stretches 72 and 74 respectively of rim member 40 by horizontal plates 75 welded to the lowermost ends of channels 68 and 70 and suitably bolted to the uppermost faces of stretches 72 and 74. Channels 68 and 70 are disposed with the trough-presenting portions thereof facing inwardly toward side walls 30 and 32, and opposed channels 68 and 70 respectively are interconnected by cross channels 76 in perpendicular relationship to channels 68 and 70 and located in parallel, horizontally spaced relationship. Elongated connector channels 78 joined to and spanning the distance between the uppermost ends of channels 68 and 70 secured to each stretch 74, form the remaining portion of frame means 24 and thereby define a substantially box-like support for elevating and driving mechanism 20. Parallel, horizontally spaced cross members 80 and 82 reciprocably disposed within opposed grooves of channels 68 and 70 respectively, mount a transversely U-shaped support 84 in perpendicular relationship to cross members 80 and 82 and substantially overlying side walls 30 and 32 of receptacles 12 and 14. Support 84 maintains cross members 80 and 82 in parallel relationship as the entire assembly is reciprocated relative to frame means 24, with opposed ends of cross members 80 and 82 sliding in corresponding channels 68 and 70.

Mechanism for shifting the frame defined by cross members 80 and 82 and support 84 comprises a pair of shafts 86 and 88 carried by suitable bearings 90 at opposed ends thereof, supported by cross channels 76 in positions with shafts 86 and 88 adjacent to and parallel with corresponding, opposed connector channels 78. Sheaves 92 secured to respective shafts 86 and 88 for rotation therewith and adjacent corresponding bearings 90 overlie the ends of cross members 80 and are operably coupled therewith by chains 94 trained over each of the sheaves 92 and releasably connected to corresponding cross members 80 and 82 by eye means 96 extending laterally from one vertical face of each of the cross members 80 and 82. The end of shaft 86 proximal to channel 70 extends outwardly from an adjacent cross channel 76 and is provided with a relatively large sprocket wheel 98 thereon operably coupled with a winch sprocket (not shown) through an endless chain 100 passing over sprocket wheel 98, as well as the winch sprocket on winch bracket 102 secured to channel 70 on stretch 72 adjacent the uppermost end of the defined channel. Operating handle 104 secured to the shaft 106 having the winch sprocket thereon, permits rotation of sprocket wheel 98 with a considerable gain in mechanical advantage by virtue of the difference in size between sprocket wheel 98 and that of the winch sprocket rotatably mounted on bracket 102.

Sprocket wheels 108 secured to each of the shafts 86 and 88 adjacent channels 70, are operably interconnected by an endless chain 110 to the end that upon rotation of sprocket wheel 98 by rotation of handle 104, shafts 86 and 88 are rotated simultaneously to pay out or take in respective chains 94.

Figure 2:
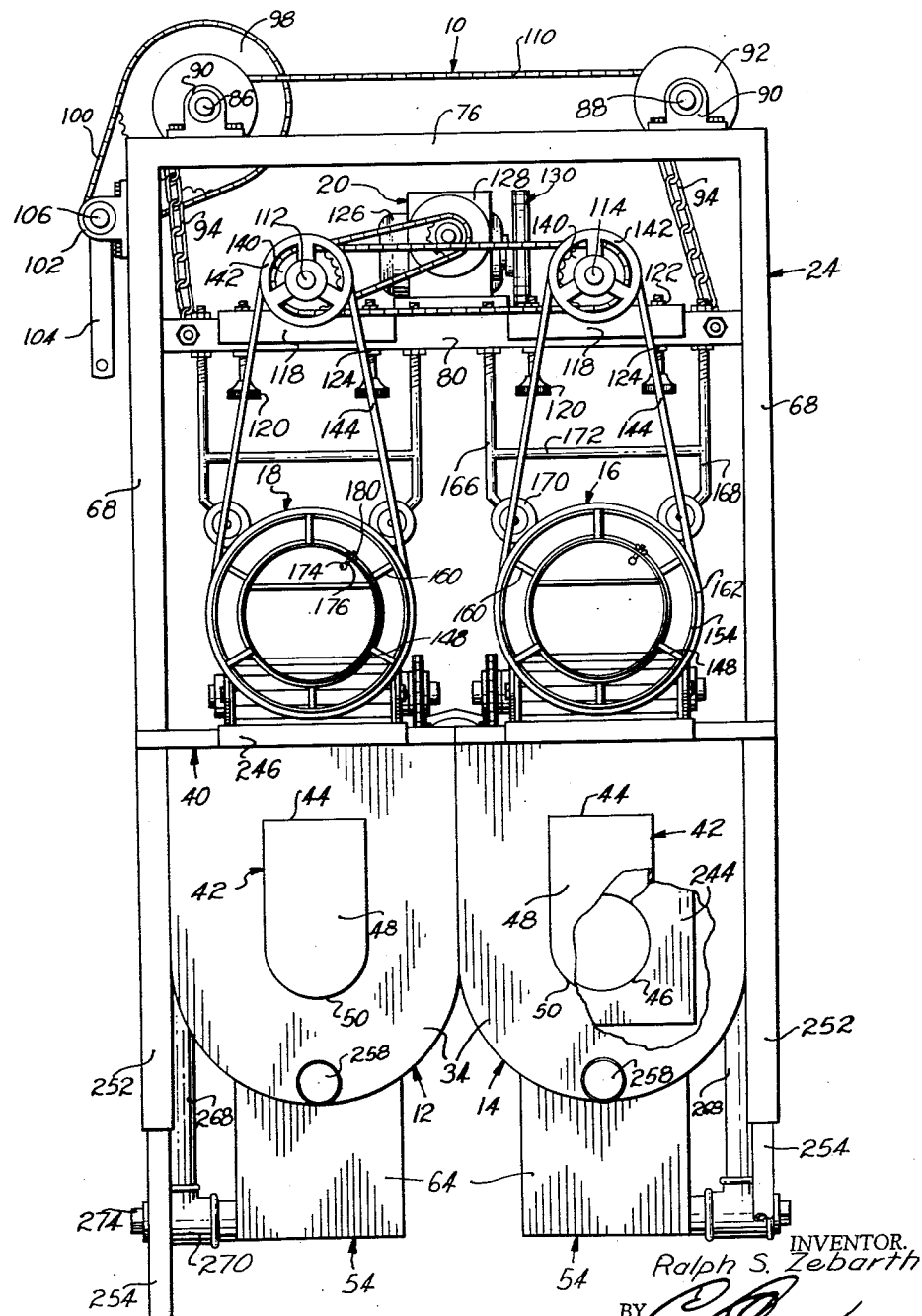
FIG. 2 is a front elevational view of the cooling machine illustrated in FIG. 1, certain parts thereof being broken away to reveal details of the components therebehind.

A pair of drive shafts 112 and 114 are rotatably carried by respective bearings 116, in turn mounted in horizontally spaced relationship on transversely U-shaped brackets 118 embracing respective cross members 80 and 82. As best shown in FIGS. 1 and 2, there are a pair of brackets 118 on each of the cross members 80 and 82 and disposed in positions causing shafts 112 and 114 carried by bearings 116 to be disposed in parallel relationship not only with each other but also with the longitudinal length of receptacles 12 and 14 and shafts 86 and 88.

Brackets 118 are adjustable vertically relative to cross members 80 and 82 and therefore, a pair of upright adjustment screws 120 are provided for each of the brackets 118, extending upwardly through corresponding passages in cross members 80 and 82, as well as aligned openings in the upper horizontal sections of brackets 118. Nuts 122 complementally threaded over screws 120 on opposed sides of the defined horizontal sections of brackets 118 maintain the latter in predetermined relationship relative to cross members 80 and 82 by virtue of screws 120 being threaded into nuts 124 welded to the underfaces of respective cross members 80 and 82.

Power operated means for rotating shafts 112 and 114 includes an electric motor 126 mounted on support 84 and operably coupled with a gear box 128 through suitable belt and pulley means broadly numerated 130. Sprocket wheel 132 secured to shaft 112 adjacent cross member 80 is operably coupled with the output sprocket 134 of gear box 128 by an endless chain 136. Furthermore, shafts 112 and 114 are rotatably interconnected by virtue of endless chain 138 passing over sprockets 140 secured to respective shafts 112 and 114 proximal to cross member 80.

Pulleys 142 secured to the outermost opposed ends of each of the shafts 112 and 114 outboard of respective cross members 80 and 82, carry endless V-belts 144 depending therefrom and serving to support tubular structures 16 and 18.

Figure 3:
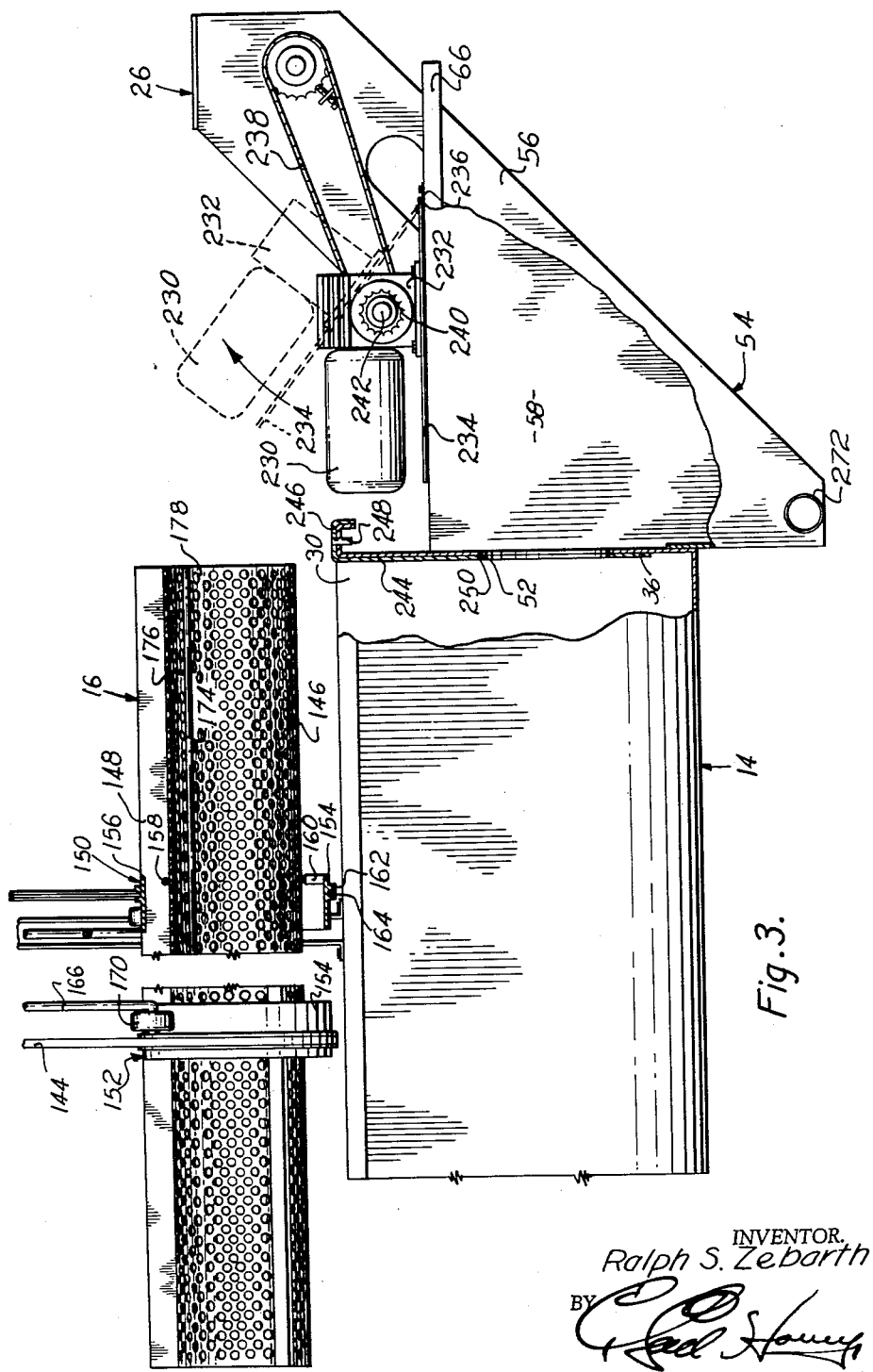
FIG. 3 is an enlarged, fragmentary, side elevational view of the cooling machine illustrating the disposition of the tubular, giblet-receiving structures at the uppermost ends of their paths of travel.

As best shown in FIGS. 2 and 3, each of the tubular structures 16 and 18 are identical in construction and therefore, only structure 16 will be described in detail. An elongated, perforated drum 146 comprises the major portion of structure 16 and is substantially coextensive in length with receptacle 14, into which the same is adapted to be removably disposed. A series of longitudinally extending, radial, circumferentially spaced vanes 148 are welded to the outer surface of drum 146 for agitating the liquid coolant such as water, in receptacle 14, while means for supporting structure 16 from elevating and driving mechanism 20 includes a pair of longitudinally spaced collars broadly numerated 150 and 152 and each including a cylindrical member 154 having an outer diameter substantially equal to the distance between the outwardly facing margins of opposed vanes 148 secured to drum 146. Thus, each of the vanes 148 is provided with a number of substantially rectangular notches 156 therein receiving respective cylindrical members 154 and maintaining the latter in predetermined spaced, coaxial relationship relative to drum 146. Additional support for each member 154 includes a ring 158 beneath each member 154 and secured to the outer face of drum 146 in alignment with one circular margin of corresponding annular members 154. Rings 158 extend through suitable openings in vanes 148, while rods 160 spanning the distance between rings 158 and respective inner surfaces of members 154 serve to support the latter since rods 160 are disposed in radially extending relationship relative to drum 146 and intermediate proximal vanes 148.

Annular projections 162 integral with the outer surfaces of respective cylindrical members 154 are provided with V-shaped grooves 164 extending around the entire outer peripheral surface of projections 162 and disposed to receive V-belts 144. It is to be understood in this connection that collars 150 and 152 are disposed on drum 146 in predetermined positions whereby grooved projections 162 receive V-belts 144 with opposed ends of drum 146 abutting the innermost surfaces of panels 34 and 36.

In order to maintain tubular structures 16 and 18 in direct underlying relationship to respective shafts 112 and 114, parallel bracket arms 166 and 168 depending from corresponding cross members 80 and 82 in direct overlying relationship to each of the structures 16 and 18, have rollers 170 rotatably mounted on the lowermost ends thereof for rotation on axes parallel wtih the longitudinal axes of respective drums 146. Horizontal connectors 172 joined to opposed arms 166 and 168 maintain the latter in parallel relationship and thereby cause rollers 170 to rotatably engage corresponding, circumferentially extending surfaces of members 154 adjacent projections 162 thereon. The disposition of rollers 170 relative to each member 154 is best shown in FIG. 3.

In order to assure agitation of the giblets within each of the drums 146, an elongated agitator shaft 174 is provided within each of the drums 146 and has a series of laterally extending members 176 joined thereto and projecting outwardly through suitable perforations 178 in each drum 146. The outermost ends of members 176 projecting outwardly through corresponding drums 146 are externally threaded in order to receive wing nuts 180, whereby agitators 174 extend radially inwardly from each drum 146 toward the longitudinal axis thereof. It should also be noted that agitator rods 174 are substantially coextensive in length with respective drums 146 to assure agitation of the giblets throughout the path of travel thereof through structures 16 and 18.

Inasmuch as the conveyor assemblies 26 removably disposed in sumps 54 are identical, only the assembly 26 located in the sump 54 connected to receptacle 12 and illustrated in FIGS. 4 to 6 inclusive, will be described with particularity. The defined conveyor assembly comprises a pair of polygonal side panels 182 and 184 interconnected by and maintained in parallel, normally horizontally spaced, aligned relationship by a pair of longitudinally spaced, transversely extending box members 186 and 188 welded to the innermost surfaces of respective side panels 182 and 184. The normally lowermost, upright edges 190 of panels 182 and 184 are disposed at an angle with respect to longitudinally extending margins 192 thereof so as to cause edges 190 and margins 192 to complementally engage front wall 64 and end wall 62 respectively of sump 54. Furthermore, panels 182 and 184 are of sufficient length to cause the same to extend upwardly above the rim member 66 of sump 54, with a top panel 194 secured to the upper edges 196 of panels 182 and 184 in spanning relationship thereto, panel 194 being located in a substantially horizontal position when assembly 26 is disposed within sump 54 and the opening defined by upright extremities 198 of panels 182 and 184 as well as the proximal end of top panel 194 presenting an outlet for the giblets raised from within the liquid in sump 54 by assembly 26. Additional support for panels 182 and 184 includes a crossbar 200 interconnecting the normally uppermost, longitudinally extending edges of panels 182 and 184 and located intermediate top panel 194 and edges 190.

Parallel, transversely L-shaped brackets 202 and 204 welded to the innermost faces of each of the panels 182 and 184 in longitudinally extending relationship thereto, have outwardly projecting legs 206 of somewhat less longitudinal length than the integral, longitudinally extending legs 208 thereof and secured to respective panels 182 and 184 for carrying an endless conveyor belt 210, disposed with the major longitudinal stretches thereof in engagement with respective legs 206 of brackets 202 and 204.

Means for carrying conveyor belt 210 includes a pair of parallel, normally horizontal shafts 212 and 214 having a pair of opposed sprocket wheels 215 secured to each of the same for rotation therewith and carrying conveyor belt 210 at opposed ends thereof. A substantially U-shaped bracket 216 secured to the normally lowermost face of box member 186 intermediate the ends thereof by bolt and nut means 218, rotatably carries shaft 214, while shaft 212 extends through and is rotatably carried by aligned bearings 220, bolted to opposed outer faces of panels 182 and 184 adjacent the normally uppermost ends thereof. Laterally extending flights 222 integral with or connected to the individual slats of conveyor belt 210 are adapted to engage the giblets and raise the same to the upper part of conveyor belt 210 during rotation of shafts 212 and 214, as is clearly understandable from FIG. 6.

In this connection, it is to be noted that transversely extending shelf 224 carried by the inner faces of panels 182 and 184 in spanning relationship thereto and disposed in a position directly overlying shaft 214, serves to cause the giblets delivered from the proximal end of a drum 146, to be deposited on belt 210 for conveyance to the uppermost end of assembly 26.

The end of shaft 212 normally proximal to panel 184, extends outwardly therefrom and mounts a relatively large sprocket wheel 228 adapted for driving belt 210, as will be made clearer hereinafter.

Referring now to both of the conveyor assemblies 26 removably disposed in respective sumps 54, it is to be understood that the ends of shafts 212 having sprocket wheels 228 thereon extend toward each other and are in coaxial alignment when edges 190 of panels 182 and 184 engage corresponding front walls 64 of sumps 54. Means for driving both of the shafts 212 simultaneously, includes an electric motor 230 operably coupled with a gear box 232, with both of the same mounted on a plate 234 spanning the distance between adjacent stretches of rim members 66 of sumps 54. Hinge means 236, forming a part of plate 234, permits the same to swing vertically about the horizontal axis of hinge means 236 whereby chains 238, normally in operable engagement with opposed sprocket wheels 240 on gear box 232, may be removed from sprocket wheels 228 on shafts 212. It is thus to be noted that gear box 232 is of the type having a pair of coaxial output shafts 242 carrying sprocket wheels 240 extending outwardly in opposed directions and rotatable at the same speed. It is, however, understandable that gear box 232 may be of the type having a common output shaft 242 driven at a suitably reduced speed.

In order to prevent undesirable flakes of metal from being chipped from the inner surfaces of panels 34 and 36 by opposed ends of drums 146 proximal thereto, brass wear plates 244 are provided on the inner face of each of the panels 34 and 36 and maintained in predetermined positions by virtue of the uppermost hooked ends 246 being complementally disposed over rim member 40, as shown in FIG. 3. Pins 248 secured to the underfaces of hooked ends 246 are received within respective openings in rim member 40 and thereby preclude lateral shifting of wear plates 244. Each of the wear members 244 is also provided with a circular opening 250 therein located in a position to complementally align with openings 46 or 52 in corresponding panels 34 or 36.

Tubular, transversely rectangular legs 252, secured at the uppermost ends thereof to the under surface of respective stretches 72 and 74 of rim member 40, are disposed to maintain receptacle 12 and 14 as well as sumps 54 in predetermined relationship with respect to a supporting surface such as the floor of the processing plant or the like, and receive cylindrical members 254 telescoped into the lowermost ends thereof. Means is provided (not shown) for maintaining members 254 in predetermined relationship relative to respective legs 252 whereby the disposition of receptacles 12 and 14 and particularly opposed ends thereof, may be adjusted as desired relative to the supporting surface and notwithstanding the fact that the floor may be uneven.

Drain conduits 256 in each of the panels 34 adjacent the lower extremities thereof and closed by removable caps 258, permit draining of receptacles 12 and 14 upon removal of such caps.

Receptacles 12 and 14 are adapted to contain quantities of a liquid coolant such as water or the like, and therefore it is contemplated that a pair of supply pipes 260 be provided in positions to direct fresh water into the upper open ends of each of the chutes 42. In order to permit the excess liquid to overflow from receptacles 12 and 14 at the ends thereof opposed to chutes 42, upright overflow conduits 268 communicating at the lowermost ends thereof with T's 270 in turn coupled with pipes 272 on the lower ends of side walls 56 of sumps 54, permit the liquid in receptacles 12 and 14 to overflow in response to the rate of inflow through respective chutes 42. Plugs 274 closing the outermost ends of T's 270 permit draining of sumps 54 as desired, and it is further noted that conduits 268 and thereby T's 270 may be rotated relative to respective pipes 272 to change the level at which the liquid within receptacles 12 and 14 as well as sumps 54 is maintained.

In operation, and assuming that the frame defined by cross members 80 and 82 as well as support 84, and carrying tubular structures 16 and 18, is at the lowermost end of its path of travel within the guides presented by the opposed channels 68 and 70 of frame means 24, the valves controlling passage of water through supply pipes 260 are opened to permit water to be directed into receptacles 12 and 14 via chutes 42 and respective inlet openings 46. The level of water within receptacles 12 and 14 as well as sumps 54 communicating therewith, is of course determined by the position of overflow conduit 268 and in particular, the relative elevation of the uppermost end thereof. As soon as receptacles 12 and 14 are filled, the valves controlling flow of water through pipes 260 are adjusted to cause a predetermined quantity of water per unit of time to overflow through respective conduits 268.

Inasmuch as machine 10 is adapted for cooling products in the nature of giblets, it is preferred that ice be introduced into the liquid coolant in receptacles 12 and 14 in order to lower the temperature of such liquid to approximately 32° F. When machine 10 is positioned in the processing line, it is generally convenient to provide ice bunkers in proximity to each of the receptacles 12 and 14 whereby ice may be quickly introduced into the water in receptacles 12 and 14 when necessary to maintain the temperature of the coolant at the required level. In this connection, it is contemplated that the temperature of the coolant liquid in receptacles 12 and 14 be checked at regular intervals, such as every five minutes, with a thermometer to determine if the water is at the correct temperature. In this manner, the desired low level temperature may be maintained at a relatively constant point, notwithstanding the fact that giblets are being continuously advanced through such liquid and are thereby cooled by the same. It is noted that the giblets should preferably be cooled to a temperature of approximately 36° to 40° F. so that the same are in condition for packaging and then placement in the body cavity of the birds.

In the initial placement of machine 10 on a suitable supporting surface, adjustable members 254 are shifted within respective legs 252 to thereby maintain receptacles 12 and 14 as well as sumps 54 in predetermined positions relative to the horizontal. It is particularly contemplated that the ends of receptacles 12 and 14 having sumps 54 attached thereto be disposed at a slightly lower level than the opposite ends of receptacles 12 and 14, whereby drums 146 of tubular structures 16 and 18 are also located at a slight inclination with respect to the floor to facilitate advancement of the giblets through drums 146. The most advantageous angle at which structures 16 and 18 should be disposed may readily be determined under operating conditions but it can also be seen that the water entering chutes 42, passing longitudinally through receptacles 12 and 14 and subsequently being discharged through respective overflow conduits 268, also serves to aid the forward advancement of the giblets through structures 16 and 18.

With machine 10 now in condition for operation, electric motor 126 is actuated to cause gear box 128 to be operated through belt and pulley means 130. The output sprocket 134 of gear box 128 rotates shaft 112 through sprocket wheel 132 and endless chain 136 extending over sprocket wheels 132 and 134. Since shafts 112 and 114 are interconnected through endless chain 138 passed over sprocket wheels 140, all of the pulleys 142 are thereby rotated at a constant, synchronized speed and effecting rotation of tubular structures 16 and 18 on the longitudinal axes thereof as belts 144 carrying drums 146 are moved. Rollers 170 on arms 166 maintain drums 146 in direct alignment with respective openings 46 and 52 during rotation of tubular structures 16 and 18 whereby giblets directed into the inlet ends of receptacles 12 and 14 through chutes 42 are caused to be introduced into the ends of drums 146.

Because of the relatively slick outer surfaces of the giblets, the same tend to slide down the slightly inclined surfaces of drums 146 toward sumps 54. During rotation of drums 146, the giblets are agitated and tumbled within the coolant which not only rapidly removes the body heat from the poultry products, but also serves to tenderize the same because of the kneading and flexing of the giblets by the water which is being agitated during rotation of structures 16 and 18.

Elongated agitator bars 174, secured to and extending inwardly into each of the drums 146, are disposed to engage the giblets and prevent the same from collecting at the lowermost portions of drums 146 as the products are advanced through the agitating and tumbling structure. It is to be noted that bars 174 present relatively smooth surfaces which suitably agitate the giblets without tearing or otherwise deleteriously affecting the same which might otherwise occur if relatively sharp edges or surfaces were presented.

The vanes 148 extending outwardly from each of the drums 146 serve to agitate the liquid within receptacles 12 and 14 and thereby cause the same to pass through perforations 178 in a substantially spiral path through drums 146, which thereby not only enhances the agitation and tumbling as well as the flexing and kneading of the giblets, but also tends to advance the giblets through each of the structures 16 and 18.

The giblets are delivered from the discharge ends of drums 146 directly onto respective conveyor belts 210, with shelves 224 serving to assure passage of the products onto belts 210 rather than into the space at the lowermost ends of sumps 54.

It is to be recognized that motor 230 is also actuated substantially simultaneously with starting of motor 126, whereby endless chains 238 trained over sprockets 240 and 228 cause shafts 212 to be rotated in a direction to move conveyor belts 210 in a substantially clockwise direction, viewing FIG. 6. The flights 222 on belts 210 pick the giblets up and direct the same to the uppermost ends of conveyor assemblies 26 for discharge to a suitable delivery point where the same may be immediately packaged. The giblets are thereby raised out of the water, which is also maintained in sumps 54 to a predetermined level as determined by the uppermost ends of overflow conduits 268, and therefore continuous and automatic cooling of the giblets is performed without operator attention being required other than maintenance of the coolant liquid at a predetermined low temperature.

It is necessary to clean receptacles 12 and 14, tubular structures 16 and 18, conveyor assemblies 26 and sumps 54 at frequent intervals, not only to maintain the quality of the poultry products at a maximum but also to meet relatively rigid governmental cleanliness standards.

Machine 10 is constructed in a novel manner to facilitate cleaning of the various components in a minimum of time and labor. Motors 126 and 230 are stopped and the operator of the machine turns operating handle 104 in a direction to cause chains 94 to be wound on respective sheaves 92 in response to rotation of shafts 86 and 88, turned through sprocket wheel 98 operably coupled with the sprocket on winch bracket 102. As previously set forth, shafts 86 and 88 are rotatably interconnected through endless chain 110 trained over sprockets 108 on opposed shafts 86 and 88 and therefore, chains 94 are wound on sheaves 92 at equal rates.

Cross members 80 and 82 are shifted upwardly within respective channels 68 and 70 as chains 94 are wound on sheaves 92, whereby tubular structures 16 and 18 may be moved to positions as illustrated in FIG. 2 where all of the component parts may be readily cleaned.

Conveyor assemblies 26 may also be rapidly shifted from corresponding sumps 54 by first tilting plate 234 upwardly about the horizontal axis of hinge means 236 to a dotted line position as illustrated in FIG. 3, whereupon chains 238 may be disconnected from sprocket wheels 228 permitting entire assemblies 26 to be pulled out of sumps 54.

Cleaning of receptacles 12 and 14 as well as sumps 54 may be effected by removing caps 258 from conduits 256 to thereby allow the water to drain from receptacles 12 and 14 and furthermore, plugs 274 may be removed from T's 270 whereby the liquid coolant drains from sumps 54.

The time required to cool the giblets within machine 10 of course varies with the temperature of the liquid coolant, as well as the length of drums 146, but it is preferred that the rate of rotation of structures 16 and 18, the inflow of fresh liquid, and the angle of inclination of drums 146 all be correlated so that approximately four to six minutes is required to advance the giblets through the liquid coolant and thereby lower the temperature of the same to approximately 36° to 40° F., as referred to above.

Having thus described the invention what is claimed as new and desired to be secured by Letters Patent is:

1. A machine for cooling giblets comprising elongated, open-top receptacle means adapted to receive a liquid coolant and provided with inlet means and outlet means at opposed ends thereof; support means overlying the receptacle means and including upright guide means on opposed sides of said receptacle means; and a unit carried by said support means and including horizontal frame means slidable vertically in said guide means, shaft means rotatably mounted on said frame means for rotation on a generally horizontal axis, an elongated, cylindrical, perforated drum of a length generally equal to the inner longitudinal dimension of said receptacle means, horizontally spaced belt and pulley means suspending said drum from said shaft means whereby the drum is rotated on the axis thereof in response to rotation of the shaft means, prime mover means carried by said frame means, means operably coupling the prime mover to said shaft means for rotating the latter to effect rotation of said drum, selectively operable means mounted on said support means and coupled to said frame means for raising and lowering the latter to permit the drum to be lowered from a location above the coolant to a position at least partially submerged in the coolant and aligned with said inlet means and said outlet means for receiving giblets introduced into the receptacle means through said inlet means and for discharging said giblets from the drum through said outlet means whereby the giblets are continuously agitated and tumbled within the drum while being subjected to the coolant, and drum restraining means carried by said frame means, depending therefrom and including roller means engaging the drum on opposed sides thereof for preventing substantial horizontal and vertical movement of the drum relative to said frame means.

2. A machine as set forth in claim 1 wherein said drum restraining means includes a pair of horizontally spaced frame components adjustably secured to the frame means at opposite ends of the drum and each carrying a pair of rollers disposed to engage the outer periphery of the drum above the horizontal diameter of the latter.

3. A machine as set forth in claim 1 wherein is provided means shiftably mounting said shaft means on the frame means to permit selective adjustment of the angularity of said shaft means with respect to the horizontal to thereby permit tilting of said shaft means and the drum suspended therefrom, at a sufficient angle to cause the giblets to be advanced through the drum from said inlet means to said outlet means of the receptacle as the drum is rotated.

4. A machine as set forth in claim 1 wherein said drum is provided with vane means on the outer surface thereof for agitating the coolant within the receptacle during rotation of the drum, and elongated, substantially rectilinear agitator means carried by the drum, extending into and substantially the length of the latter and disposed to engage the giblets for preventing the latter from collecting at the lowermost portion of the drum as the same are advanced therethrough.

5. A machine as set forth in claim 4 wherein said agitator means is provided with relatively smooth outer surfaces to prevent the latter from tearing or otherwise deleteriously affecting the giblets during advancement, tumbling and agitation of the same within the drum.

6. A machine as set forth in claim 5 wherein said agitator means includes an elongated, transversely circular rod secured to the innermost surface of the drum in parallel, spaced relationship thereto.

7. A machine as set forth in claim 6 wherein is provided a plurality of members joined to the rod in spaced relationship along the longitudinal length thereof and extending through perforations in the drum, there being means removably disposed on the outer ends of the members extending through the drum securing the members and thereby said rod to the drum.

References Cited in the file of this patent

UNITED STATES PATENTS

| | | |
|---|---|---|
| 790,909 | McCann | May 30, 1905 |
| 1,310,662 | Kellington | July 22, 1919 |
| 2,355,405 | Vucassovich | Aug. 8, 1944 |
| 2,882,550 | Zebarth | Apr. 21, 1959 |
| 2,942,429 | Van Dolah et al. | June 28, 1960 |

FOREIGN PATENTS

| | | |
|---|---|---|
| 28,354 | Norway | Oct. 29, 1917 |
| 475,307 | Germany | Apr. 22, 1929 |
| 643,383 | France | May 15, 1928 |